United States Patent [19]
Uchida

[11] 3,824,459
[45] July 16, 1974

[54] METHOD OF MEASURING THE ELECTROSTATIC CAPACITY OF A CAPACITOR

[75] Inventor: Kozo Uchida, Tokyo, Japan
[73] Assignee: Iwatsu Electric Co., Ltd., Tokyo, Japan
[22] Filed: Sept. 17, 1973
[21] Appl. No.: 397,745

[30] Foreign Application Priority Data
Sept. 21, 1972 Japan................................ 47-94926

[52] U.S. Cl............................................ 324/60 CD
[51] Int. Cl......................... G01r 11/52, G01r 27/26
[58] Field of Search ............ 324/60 CD, 60 C, 60 R

[56] References Cited
UNITED STATES PATENTS
3,370,229  2/1968  Hamburger et al............... 324/60 R
3,453,535  7/1969  Anglin............................. 324/60 CD
3,761,805  9/1973  Dornberger........................ 324/60 C

*Primary Examiner*—Stanley T. Krawczewicz
*Attorney, Agent, or Firm*—Maleson, Kimmelman & Ratner

[57] ABSTRACT

This invention pertains to an invention for measuring the electrostatic capacity of a capacitor and comprises three processes. The first process is the application of a fixed voltage to both a capacitor to be measured and a standard capacitor; the second process is the discharging of the electric charges of the standard capacitor during the time a counter counts from O to n and then obtaining the terminal voltage $V_s$ of the standard capacitor; the third process is the discharging of the electric charges of the capacitor to be measured during the time a terminal voltage of the capacitor to be measured changes from said fixed voltage to the voltage $V_s$ and then obtaining a count m counted during this time. At the conclusion of the third process the electrostatic capacity of the capacitor to be measured is obtained according to a ratio between said counts m and n and an electrostatic capacity of said standard capacitor.

5 Claims, 7 Drawing Figures

| INTERVAL<br>SWITCH | $T_0$ | $T_1$ | $T_2$ |
|---|---|---|---|
| 2 | ON | ON | OFF |
| 3 | ON | OFF | OFF |
| 4 | ON | ON | OFF |
| A | OFF | OFF | ON |

METHOD OF MEASURING THE ELECTROSTATIC CAPACITY OF A CAPACITOR

The present invention relates to a method of measuring the electrostatic capacity of a capacitor.

In the prior art, there are various methods of measuring the electrostatic capacity of a capacitor. A first typical and well known method is called an AC bridge. The AC bridge is normally comprises of four arms, a galvanometer and a sine wave oscillator. Each first arm and second arm includes a resistor, the third arm includes a capacitor of which the electrostatic capacity is to be measured and the fourth arm includes a standard capacitor having a reference capacity which has been determined previously. A sine wave voltage from said oscillator is applied across one diagonal of the bridge comprised of said four arms. Then a balanced condition is detected by said galvanometer which is set along another diagonal of said bridge. In this balanced condition the electrostatic capacity which is to be measured is calculated by using the values of said resistors and said reference capacity.

A second typical and well known method is to use a constant DC current $i$. The constant DC current $i$ is applied to one terminal of a capacitor of which the electrostatic capacity is to be measured. Then a terminal voltage $V_t$ at the terminal of the capacitor increases according to the following equation.

$$V_t = k \times (i \times t/C_x)$$

where $t$ is an elapsed time, $C_s$ is the electrostatic capacity of a capacitor which is to be measured and $k$ is a constant. Then said constant DC current $i$ is also applied to a standard capacitor the electrostatic capacity of which is previously determined and is $C_s$ in the same manner as mentioned above. By applying said constant DC current $i$ to one terminal of the standard capacitor, a terminal voltage $V_s$ at the terminal of the standard capacitor increases in the same manner as mentioned above and the following equation is obtained.

$$V_s = k_s \times (i \times t_s/C_s)$$

where $t_s$ is an elapsed time and $k_s$ is a constant. When each of the voltages $V_t$ and $V_s$ reaches a voltage $V_e$ the following equation is obtained.

$$k \times (i \times t/C_x) = k_s \times (i \times t_s/C_s) = V_e.$$

Further $$C_x = (k/k_s) \times (t/t_s) \times C_s$$

is obtained. Obviously $C_x$ is proportional to $t/t_s$ and the ratio $t/t_s$ can be easily measured.

The above-mentioned methods are typical and widely used for measuring the electrostatic capacity of a capacitor. When the electrostatic capacity of a capacitor with a small value of electrostatic capacity is measured, the above-mentioned two methods are adequate. However, when the electrostatic capacity of a capacitor with a large value of electrostatic capacity is measured, the above-mentioned methods are not adequate. This is because when a large electrostatic capacity, for instance 1,000,000 μF, is measured by these methods, the AC current from said oscillator which is used in the first method, or the DC current $i$ which is used in the second method, becomes extremely large, and, consequently, it is difficult to measure, and is almost impossible to measure with high accuracy, such large electrostatic capacity. The maximum value of electrostatic capacity which can be measured by such prior methods is limited to 100,000 μF. However, when a large electrostatic capacity, such as 10,000 μF, is measured by the prior methods, the error reaches approximately 2 through 4 percent.

Further, in the prior methods, it is necessary to use a capacitor for reference, that is, a standard capacitor, the capacity of which should be almost equal to that of the capacitor to be measured. This necessity is a definite drawback when the electrostatic capacity to be measured is over 10 μF because it is usually difficult to produce such a large capacitor as a standard capacitor which should have excellent electrical characteristics.

In recent years, capacitors which have extremely large electrostatic capacities are being produced. These large capacitors are utilized, for example, as energy storage devices and the values of their electrostatic capacity reach as high as 50F. Naturally, along with the production of such large capacitors it is also necessary to provide a measuring method which is capable of measuring such large electrostatic capacity. As mentioned above, it is very difficult to easily measure such large electrostatic capacities using the measuring methods of the prior art, and it is almost impossible to measure such large electrostatic capacities with high accuracy.

It is the principal object of the present invention to provide a method for measuring electrostatic capacity of a capacitor which is capable of measuring extremely large electrostatic capacity.

A second object of the present invention is to provide a method for measuring electrostatic capacity of a capacitor with high accuracy.

A third object of the present invention is to provide a method for measuring electrostatic capacity of a capacitor within a wide range, from extremely small electrostatic capacity to extremely large electrostatic capacity, regardless of the electrostatic capacity, of the standard capacitor.

The present invention will be more apparent from the ensuing description with reference to the accompanying drawings wherein.

Figure 1:
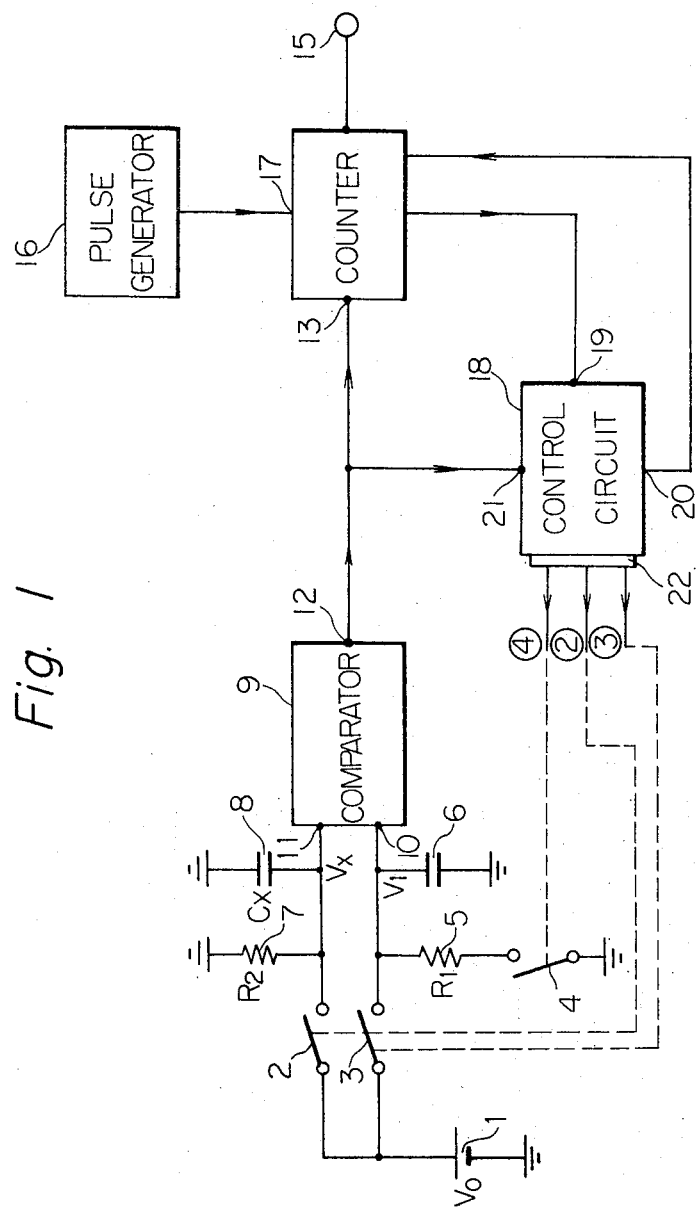
FIG. 1 is a circuit diagram of a first embodiment according to the present invention.

In FIG. 1 the reference numeral 1 designates a standard voltage supply, the voltage of which is $V_0$. The voltage $V_0$ of the standard voltage supply 1 is applied through a switch 3 to one end of a resistor 5 and one end of a standard capacitor 6. The resistance of the resistor 5 is $R_1$ and the electrostatic capacity of the standard capacitor 6 is $C_1$. Another end of the resistor 5 is connected to ground through a switch 4 and another end of the standard capacitor 6 is also connected to ground. The end of the standard capacitor 6 not connected to ground is further connected to a first input 10 of a comparator 9. Said voltage $V_0$ of the standard voltage supply 1 is also applied through a switch 2 to one end of resistor 7 and one end of a capacitor 8 the electrostatic capacity of which is to be measured. The other ends of the resistor 7 and the capacitor 8 are connected to ground. The resistance of the resistor 7 is $R_2$ and the electrostatic capacity of the capacitor 8 is $C_x$. The end of the capacitor 8 not connected to ground is further connected to a second input 11 of the comparator 9. An output signal from an output 12 of the comparator 9 occurs at the time the input voltage level at the second input 11 coincides with the input voltage level at the first input 10. The comparator 9 may be comprised of an amplifier which has an extremely high gain and a multivibrator or a combination of said amplifier and said multivibrator. The output 12 of the comparator 9 is connected to a first input terminal 13 of a counter 14. The counter 14 has a second input 17 which is connected to an output of a pulse generator 16. The pulse generator 16 provides pulses which have a predetermined fixed interval to the second input 17 of the counter 14. The counter 14 counts the number of pulses from the pulse generator 16. One output terminal 15 of the counter 14 provides the number of pulses which has been counted within a specific interval as described later. A control circuit 18 has a first input 19 which is connected to a second output of the counter 14 and a first output 20 which is connected to a third input of the counter 14. A second input 21 of the control circuit 18 is connected to the output 12 of the comparator 9. The control circuit 18 controls the operation of the switches 2, 3 and 4 in accordance with a specific sequence by using control signals②,③and④, respectively, from a second output 22 of the control circuit 18. Said specific sequence is operated by signals which are received through the inputs 19 and 21. This sequence and the functions of the inputs 19 and 21 and the output 20 will be hereinafter clarified.

It should be mentioned that the counter 14 and the pulse generator 16 can be a usual and well known counter and pulse generator, respectively. The control circuit 18 can also be a combination of usual and well known circuits, for example flip-flops or gates, and therefore, the control circuit 18 can be easily realized in various ways by a person having ordinary skill in the art to which the present invention pertains. The switches 2, 3 and 4 can be electrical switches, such as semi-conductors or reed switches, or mechanical switches.

Operation of the first embodiment of the present invention will now be explained with reference to the block diagram shown in FIG. 1.

Figures 2A, 2B:
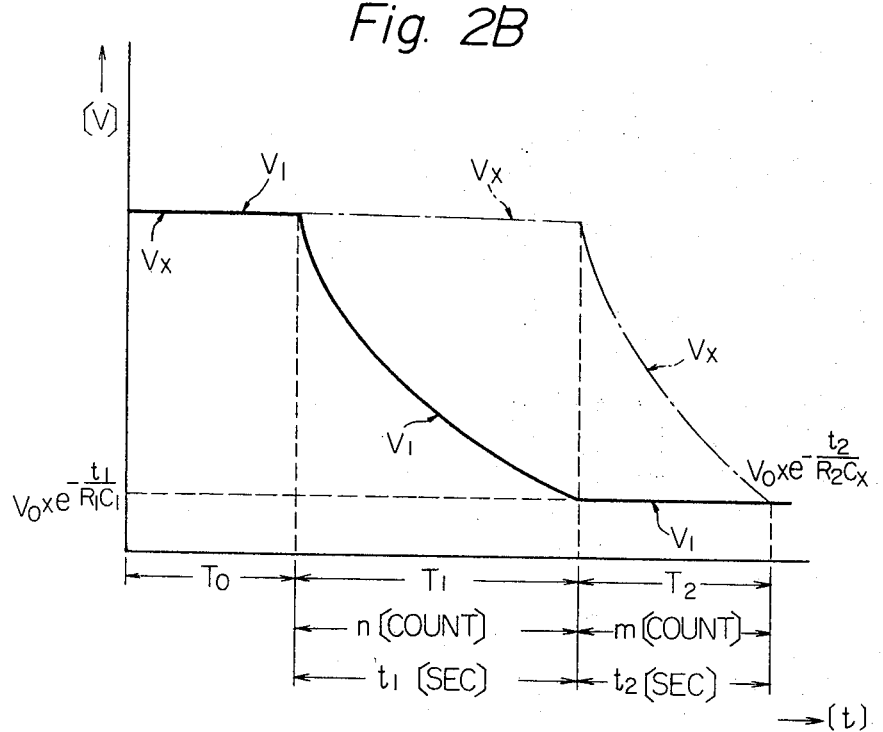
FIG. 2A is a table indicating the sequence of operation according to FIG. 1.
FIG. 2B is a graph showing changes of terminal voltages $V_1$ and $V_x$ during the intervals $T_0$, $T_1$ and $T_2$ shown in FIG. 2A.

The sequence of the operation is classified roughly into three intervals $T_0$, $T_1$ and $T_2$. In the first interval $T_0$, all the switches 2, 3 and 4 are conductive (ON). In the next interval $T_1$, only the switch 3 is non-conductive (OFF). In the last interval $T_2$, all the switches 2, 3 and 4 are non-conductive (OFF). This sequence is shown in the table of FIG. 2A.

In the first interval $T_0$, the standard voltage $V_0$ is applied to the standard capacitor 6 through the switch 3 and at the same time to the capacitor 8 through the switch 2. Then the terminal voltage $V_1$ (see FIG. 1) at the terminal of the capacitor 6 not connected to ground and the terminal voltage $V_x$ (see FIG. 1) at the terminal of the capacitor 8 not connected to ground are respectively equal to the standard voltage $V_0$. The increase of each terminal voltage $V_1$ and $V_x$ during the interval $T_0$ can be seen in FIG. 2B. FIG. 2B shows the changes of the terminal voltages $V_1$ and $V_x$ during time t, respectively. In FIG. 2B the full line indicates the change of the terminal voltage $V_1$ and the chain and dot line indicates the change of the terminal voltage $V_x$. When a selected time has passed, the interval $T_1$ starts. At the beginning of the interval $T_1$, the control circuit 18 controls the switch 3 by the control signal③from the output 22 and makes the switch 3 non-conductive. Said selected time is selected so as to be long enough for each terminal voltage to rise from 0 to the value of the standard voltage $V_0$, and this selected time is memorized in the control circuit 18. At the beginning of the interval $T_1$, the control circuit 18 also controls the counter 14 by the output signal from the output 20, and this output signal causes the counter 14 to count the pulses from the pulse generator 16. When the number of pulses counted by the counter 14 reaches "n," the counter 14 stops counting and provides an output signal to the first input 19 of the control circuit 18. The number "n" is previously determined and is memorized in counter 14. When the output signal from the counter 14 is provided to the first input 19 of the control circuit 18, the control circuit 18 controls the switches 2 and 4 by the control signals②and④from the output 22 and makes the siwtches 2 and 4 non-conductive. As soon as the switches 2 and 4 become non-conductive, the interval $T_2$ starts.

The number "n" of the interval $T_1$ corresponds to the duration time $t_1$ of the interval $T_1$ and, consequently, the duration of time $t_1$ of the interval $T_1$ is proportional to "n." In the interval $T_1$, the standard capacitor 6 discharges its electric charge through resistor 5 and the switch 4, and the terminal voltage $V_1$ falls continuously. When the elapsed time equals $t_1$, the terminal voltage $V_1$ becomes $$V_1 = V_0 \times e^{-(t_1/R_1C_1)}$$

(1)

This can be seen in the interval $T_1$ presented graphically by the solid line in FIG. 2B. The terminal voltage $V_1$ at the end of the interval $T_1$ is maintained at that value during the interval $T_2$ because the switches 3 and 4 are non-conductive in the interval $T_2$. Therefore, the standard capacitor 6 holds the terminal voltage $V_1$ obtained from the above equation (1) during the interval $T_2$. On the other hand in the interval $T_1$, the capacitor 8 still holds the terminal voltage $V_x$ which is equal to the standard voltage $V_0$ obtained in the interval $T_0$, as can be seen graphically presented by the chain and dot line in FIG. 2B.

In the interval $T_2$ the switch 2 is also non-conductive in accordance with the sequence and the capacitor 8 discharges its electric charge through resistor 7 to ground and the terminal voltage $V_x$ falls continuously. At the beginning of the interval $T_2$ the output signal from the output 20 of the control circuit 18 resets the counter 14 and at the same time said output signal causes the counter 14 to count the pulses from the pulse generator 16.

The terminal voltage $V_x$ (see FIG. 2B), which is falling continuously during the interval $T_2$, is applied to the second input 11 of the comparator 9. The terminal voltage $V_1$ of the standard capacitor 6 is applied to the first input 10 of the comparator 9. The terminal voltage $V_1$ is fixed to the value $V_1 = V_0 \times e^{-(t_1/R_1C_1)}$) during the interval $T_2$, which is obtained in the above-mentioned manner in the interval $T_1$. When the value of the terminal voltage $V_x$, applied to the second input 11, reaches the value of the terminal voltage $V_1$ applied to the first input 10, the comparator 9 applies a control signal from its output 12 to the input 13 of the counter 14 and the second input 21 of the control circuit 18. This control signal from the output 12 of the comparator 9 to the second input 21 of the control circuit 18 brings the interval $T_2$ to an end and the sequence changes into the first interval $T_0$. The control signal from the output 12 of the comparator 9 to the input 13 of the counter 14 causes the counter 14 to stop counting the pulses from the pulse generator 16. Then the number of pulses "$m$" counted during the interval $T_2$ is provided at the output terminal 15 of the counter 14. The number of pulses "$m$" is proportional to the duration of time $t_2$ of the interval $T_2$. By using the duration of time $t_2$, resistance $R_2$ of resistor 7, electrostatic capacity $C_x$ of capacitor 8 and the standard voltage $V_0$, the terminal voltage $V_x$ at the end of the interval $T_2$ is obtained in same manner as mentioned before in connection with the equation (1), and then the following equation is obtained.

$$V_x = V_0 \times e^{-(t_2/R_2C_x)} \quad (2)$$

As is clear from the above explanation and FIG. 2B, at the end of the interval $T_2$ the terminal voltage $V_x$, which is expressed by the equation (2), equals the terminal voltage $V_1$, which is expressed by the equation (1). Consequently, the following equations may be obtained from the equations (1) and (2).

$$V_0 \times e^{-(t_1/R_1C_1)} = V_0 \times e^{-(t_2/R_2C_x)} \quad (3)$$

Hence, $$t_1/R_1C_1 = t_2/R_2C_2 \quad (4)$$

Therefore, $$C_x = (R_1/R_2) \times (t_2/t_1) \times C_1 \quad (5)$$

The duration of time $t_1$ and $t_2$ are proportional to the number of pulses "$n$" and "$m$", respectively, as mentioned before. As a result thereof, the equation (5) can be rewritten by using the number of pulses "$n$" and "$m$" as follows.

$$C_x = (R_1/R_2) \times (m/n) \times C_1 \quad (6)$$

From this it is obvious the electrostatic capacity $C_x$ which is to be measured is simply determined by the number "$m$", according to the equation (6), because the values of the resistance $R_1$, the resistance $R_2$, the number of pulses n and the standard electrostatic capacity $C_1$ of the standard capacitor are previously selected and are fixed. For example, when said values are previously seected to be:

$R_1 = 10$ M$\Omega$
$R_2 = 10$ $\Omega$
$C_1 = 1$ $\mu$F
$n = 1,000$ counts we can obtain $C_x = 1.362$ F, if the number $m$ is 1,362 counts, which is counted by the counter 14 during the interval $T_2$ and provided at the output terminal 15. It is also obvious that if we select the values as shown above, then one count of the number "$m$" corresponds to 1 mF of the electrostatic capacity $C_x$ to be measured according to the equation (6). When an extremely small electrostatic capacity is to be measured, it is convenient to utilize a relation in which one count of the number "$m$" corresponds to 0.1 PF of the electrostatic capacity $C_x$ to be measured. The above-mentioned relation in which one count is proportional to the 0.1 PF is easily obtained by previously selecting such values as, for example, $R_1 = 1$ K$\Omega$
$R_2 = 10$ M$\Omega$
$C_1 = 1$ $\mu$F
$n = 1,000$ counts.

With the above-mentioned selection, and if the number m becomes 1,275 counts, we can obtain $C_x = 127.5$ PF. Thus a wide range of an electrostatic capacities, from an extremely small value to an extremely large value, is easily measured by properly selecting the values of $R_1$, $R_2$, n and $C_1$. It will also be easily understood that the electrostatic capacity $C_1$ of the standard capacitor can be freely selected regardless of the electrostatic capacity $C_x$ of the capacitor to be measured.

Another excellent effect of this invention is that the electrostatic capacity of a capacitor can be measured with high accuracy. The reason is as follows. From the equation (6), the electrostatic capacity $C_x$ to be measured is decided by the resistance $R_1$, resistance $R_2$, count n, count m and standard electrostatic capacity $C_1$. Therefore, the accuracy of the electrostatic capacity $C_x$ to be measured depends upon the accuracy of each of said values ($R_1$, $R_2$, n, m and $C_1$). Among the values of $R_1$, $R_2$, n, m and $C_1$, we can easily obtain $R_1$, $R_2$ and $C_1$ which are highly accurate. This is because, lately, resistors which have a highly accurate resistance and capacitors which have highly accurate electrostatic capacity are easily produced and easy to obtain. However, the accuracy of the count n and the count m depends upon the accuracy of the pulse generator used. While highly accurate pulse generators such as crystal oscillators can be obtained, they are very expensive. Consequently an advantage of this invention is that a highly accurate pulse generator is not required for the following reason. Using the equation (6), absolute values of the counts m and n are not required because only a ratio between the counts, that is $m/n$, is required. In this regard, when an ambient condition, such as temperature, of the pulse generator 16 varies, the interval at which pulses are produced from said generator varies simultaneously and, consequently, the number of pulses "$n$" produced by said pulse generator within some fixed duration of time changes at some ratio in proportion to the variation of said ambient condition. Under the same ambient condition the number of pulses "$m$" produced by said pulse generator also varies at said ratio and, consequently, the ratio $m/n$ does not vary. Further, because variations of ambient conditions occur gradually over a long period of time there is, practically speaking, no chance of a variation in the time between the start of the interval $T_1$ and the end of the interval $T_2$ which would effect the ratio $m/n$. For this reason a highly accurate measurement can be obtained with the present invention without using a highly accurate pulse generator such as a crystal oscillator.

Figures 3A, 3B:
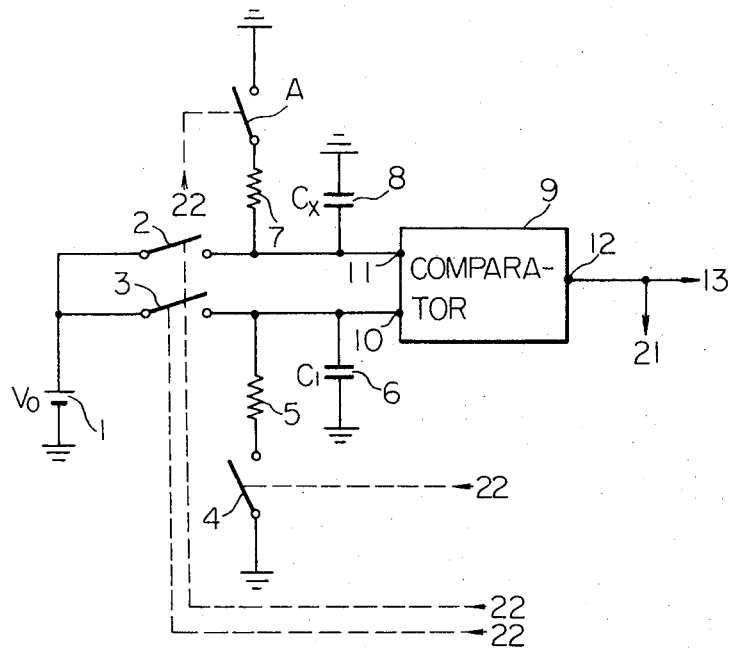
FIG. 3A is a partial circuit diagram of a second embodiment including another switch A.
FIG. 3B is a table indicating the sequence of operation according to FIG. 3A.

The sequence is not limited to the table shown in FIG. 2A. In the second embodiment shown in FIG. 3A, another switch A is connected in series with the resistor 7, and then another sequence of the operation can be obtained. This other sequence by which the measurement is obtained is shown in the table in FIG. 3B. However, the wave forms of the terminal voltages $V_1$ and $V_x$ are the same as shown in FIG. 2B and the principle of measurement is also the same as explained above. An advantage of the sequence shown in FIG. 3B is that there is no current flow across the resistor 7 during the intervals $T_0$ and $T_1$ and, therefore, this sequence requires less current flow from the standard voltage supply 1 than the current flow from the voltage supply 1 which is required for the sequence shown in FIG. 2A.

Figure 4:
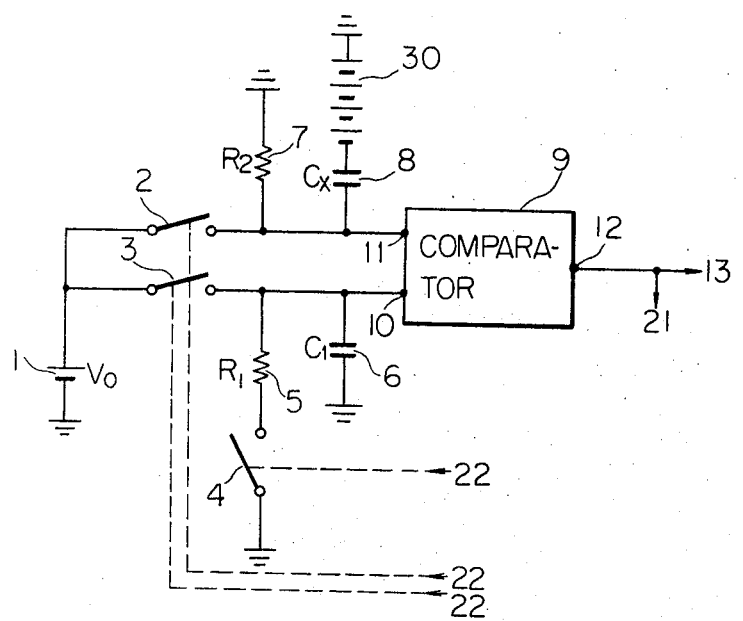
FIG. 4 is a partial circuit diagram of the third embodiment according to the present invention.

FIG. 4 partially shows an example of the third embodiment according to the present invention. A major part of this embodiment is same as the block diagram shown in FIG. 1, and the principle of the measurement is same as explained for FIG. 1. In FIG. 4, a bias voltage source 30 is inserted between ground and one end of the capacitor 8, the electrostatic capacity of which is to be measured. It is well known that electrostatic capacity of a "fixed" capacitor varies slightly with applied voltage. The purpose of inserting the bias voltage source 30 is to simulate the voltage applied to the capacitor to be measured in a circuit in which it will be used. Thus, with the embodiment of FIG. 4 the electrostatic capacity can be measured some accurately than with the embodiment of FIG. 1 because the aforementioned slight variation of the electrostatic capacity can be followed.

Figure 5:
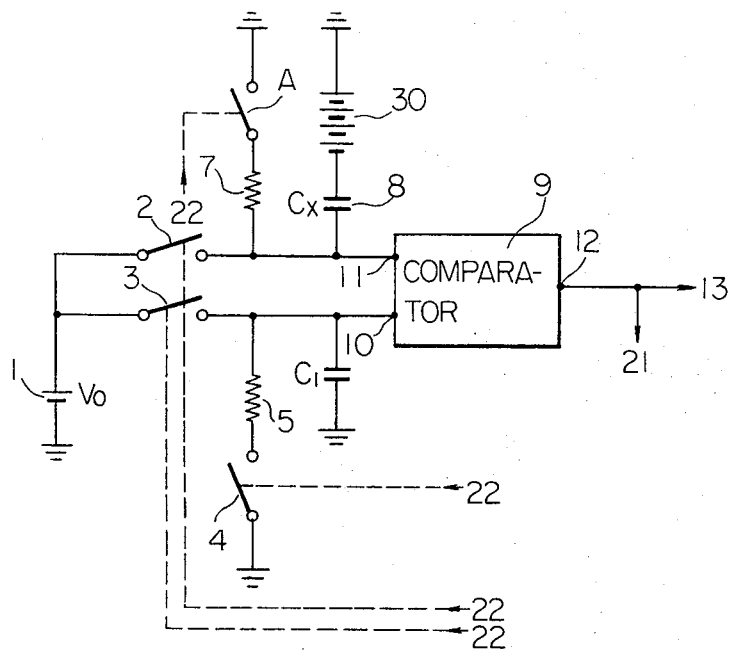
FIG. 5 is a partial circuit diagram showing a modification of the embodiment shown in FIG. 3A.

FIG. 5 partially shows a modification of the embodiment of FIG. 3A wherein the bias voltage 30, mentioned above is inserted into the circuit shown in FIG. 3A. The purpose of inserting the bias voltage 30 is same as mentioned above, and the principle of the measurement is same as explained for FIG. 3A.

What is claimed is:

1. A method of measuring the electrostatic capacity of a capacitor to be measured including:
applying a fixed voltage during a first interval to a standard capacitor and to said capacitor being measured, respectively, whereby the terminal voltages of the standard capacitor and the capacitor being measured respectively reach the fixed voltage at the end of the first interval;
discharging the electric charge of said standard capacitor during a second interval of predetermined time duration and the terminal voltage at one terminal of said standard capacitor at the end of the second interval is held;
discharging the electric charge of the capacitor being measured during a third interval, and
measuring the duration of time in which the terminal voltage of the capacitor being measured changes from said fixed voltage to said held terminal voltage, whereby the electrostatic capacity of the capacitor being measured is provided according to the electrostatic capacity of the standard capacitor, the duration of time of said predetermined time duration during said second interval and said duration of time being measured during said third interval.

2. An apparatus for measuring the electrostatic capacity of a capacitor comprising:
a fixed voltage supply;
a standard capacitor to which the fixed voltage of said fixed voltage supply is applied;
a first switching means through which the fixed voltage of said fixed voltage supply is applied to the standard capacitor;
a second switching means through which the fixed voltage of said fixed voltage supply is applied to the capacitor being measured;
a third switching means with which a first resistor is connected in series and which series connection is bridged to the standard capacitor;
a second resistor which is bridged to the capacitor being measured;
a comparator having a first input which is connected to the standard capacitor and a second input which is connected to the capacitor being measured;
a counter with which an output of said comparator is connected and which counts pulses from a pulse generator during selected intervals;
a control circuit with which said output of said comparator is also connected and which controls the duration of said selected interval and also controls said first, second and third switching means to be conductive or non-conductive according to a predetermined sequence; whereby the electrostatic capacity is provided by counts counted by the counter during said selected intervals, the resistances of said first and second resistor and the electrostatic capacity of the standard capacitor.

3. An apparatus according to claim 2, wherein a fourth switching means is connected in series with said second resistor and said control circuit controls said first, second, third and fourth switching means to be conductive or non-conductive according to another predetermined sequence.

4. An apparatus according to claim 2, wherein a bias voltage supply is connected in series with the capacitor being measured.

5. An apparatus according to claim 3, wherein a bias voltage supply is connected in series with the capacitor being measured.

* * * * *